United States Patent [19]
Lambarth et al.

[11] Patent Number: 5,894,024
[45] Date of Patent: Apr. 13, 1999

[54] ADJUSTABLE, PINCH-OFF NECK ASSEMBLY

[75] Inventors: Edwin H Lambarth, deceased, late of Onsted, by Susan Lambarth, executor; Robert L. Padley, Jr., Brooklyn, both of Mich.

[73] Assignee: Hoover Universal, Inc., Plymouth, Mich.

[21] Appl. No.: 08/851,697

[22] Filed: May 6, 1997

[51] Int. Cl.⁶ .......................... B29C 49/50; B29C 49/76
[52] U.S. Cl. ................................... 425/525; 425/527
[58] Field of Search ............................. 425/525, 527, 425/531, 182; 249/102

[56] References Cited

U.S. PATENT DOCUMENTS

| | | | |
|---|---|---|---|
| 4,032,278 | 6/1977 | Kuenzig et al. | 425/525 |
| 4,436,543 | 3/1984 | Kasten | 425/525 |
| 5,474,438 | 12/1995 | Walker, Jr. | 425/525 |
| 5,585,121 | 12/1996 | Morris | 425/531 |
| 5,589,204 | 12/1996 | Wohlgemuth | 425/525 |
| 5,629,032 | 5/1997 | Pennino | 425/525 |

*Primary Examiner*—Robert Davis
*Attorney, Agent, or Firm*—Harness, Dickey & Pierce P.L.C.

[57] ABSTRACT

A pinch-off neck assembly for use in a container blow mold system. The assembly includes a base having a parting face and portions defining a recess in the parting face. An insert is received in the recess and the insert includes an insert parting face which is coincident with the base parting face. The insert also includes surfaces that define a neck finish cavity for forming a neck finish on the molded container. An adjustment mechanism axially adjusts the positioning of the insert in the recess relative to the base.

17 Claims, 2 Drawing Sheets

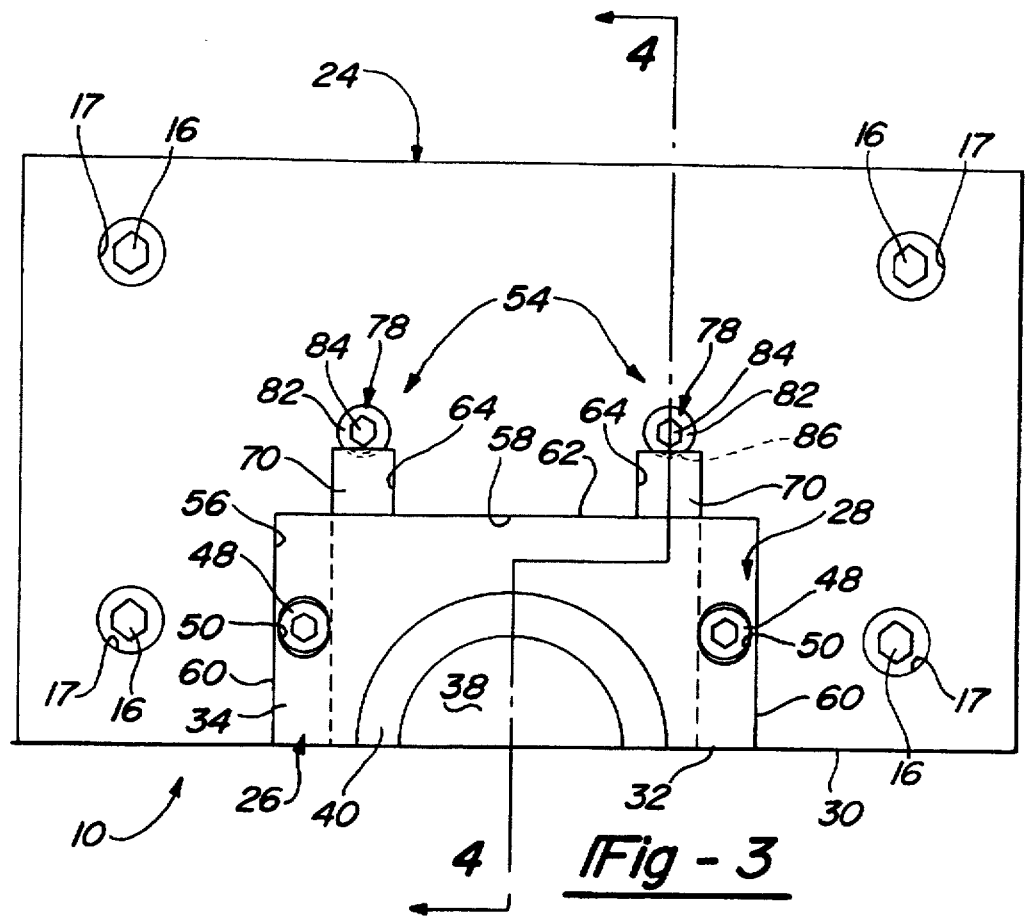
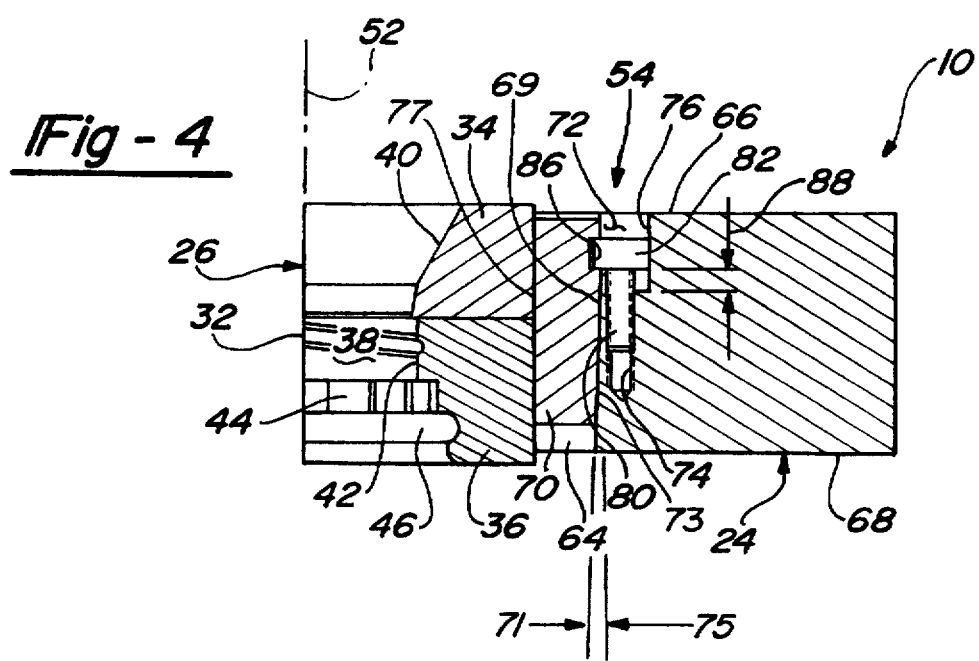

1

ADJUSTABLE, PINCH-OFF NECK ASSEMBLY

BACKGROUND OF THE INVENTION

1. Field of the Invention

This invention relates to an adjustable, pinch-off neck assembly for a container blow mold system. The assembly of the present invention facilitates lateral positioning of the pinch off neck assembly so as to reduce pinch-off separation and increase the effectiveness of the pinch-off.

2. Description of the Prior Art

The extrusion blow molding of plastic containers is well known and offers may advantages over other forms of container manufacturing. Among these advantages are the ability to produce containers with low start-up costs; to produce containers at a minimal per container cost; to produce containers with a minimal amount of material waste; to produce containers with irregular shapes; and to produce containers from a variety of materials, with the selected material having qualities particularly suited to the given application.

Molds for producing such extrusion blown containers are commonly made with each half of the mold including a main mold portion and a top block or pinch-off neck assembly. The main mold includes surfaces defining a cavity bearing the shape of one half of the container body. A neck finish cavity is defined by surfaces in the pinch-off neck assembly. Since a variety of neck finishes may be used on common container body styles (for example, the neck finish may be threaded for use with a threaded closure or it may be non-threaded and adapted for mating with a snap-on enclosure), the main mold interchangeably accepts the pinch-off neck assemblies. Pinch-off neck assemblies are themselves provided in halves and are typically bolted to the top of the main mold halves. In mounting the pinch-off neck assembly halves to the main mold halves, the parting face on each pinch-off neck assembly half is precisely aligned with the corresponding parting face of its respective main mold half.

During extrusion blow molding, molten plastic is extruded in the form of a hollow tube or parison and positioned between the open mold halves. The mold halves close trapping the parison within the mold cavity. When closed, the various parting faces of the mold are mated with one another. In the pinch-off neck assembly, the parting face are generally raised one to two thousandths of an inch so as to "pinch-off" the parison material in that area. The result is that no flash is formed in the neck finish area. This is desirable because of the cost that would be involved in trimming flash from such a detailed area of the container and because of the desired detail in the neck finish area. A blow pin assembly is then lowered, forcibly engaging the uppermost portion of the neck opening in the pinch-off neck assembly. A blow pin enters into the parison and a gas blowing medium, provided through the blow pin, inflates the parison causing it to conform to the shape of the mold cavity.

The blow pin assembly exerts a significant force during blow molding. This force is often great enough to cause separation of the parting faces in the pinch-off neck assembly. With the neck finish often being the most detailed feature of the container and requiring the highest degree of accuracy in its formation, it is important to prevent separation of the pinch-off neck assembly to the degree where the effectiveness of the pinch-off assembly is diminished, flash is formed and the subsequent closure cap will not properly fit with the neck to seal the container opening.

Previously, to fine tune positioning of the pinch-off neck assembly, bolts securing the pinch-off neck assembly to the main mold halves were loosened and the pinch-off neck assembly shimmed in a trial and error method until the proper amount was achieved to prevent separation. Such an adjustment technique is extremely cumbersome and time consuming.

Accordingly, it is an object of the present invention to provide an improved pinch-off neck assembly.

It is also an object of this invention to provide a pinch-off neck assembly which is axially adjustable.

A further object of this invention is to provide a pinch-off neck assembly where individual assemblies can be adjusted while remaining mounted to the a mold half.

SUMMARY OF THE PRESENT INVENTION

The present invention achieves the above and other objects by providing a pinch-off neck assembly with a laterally adjustable insert. The assembly itself includes a base with a recess into which the insert is received. Surfaces on the insert define a neck finish cavity which molds a portion of the parison into the neck finish of the resulting container.

Adjustability of the assembly is provided by a mechanism that laterally shifts the pinch-off neck assembly relative to the main molds, and more specifically the insert relative to the base and the main molds. The adjustment mechanism can take on a variety of constructions so long as the lateral position of the neck finish cavity is accordingly adjusted and the insert and the pinch-off assembly need not be removed from the main mold halves for adjustment. In the preferred embodiment, the adjustment mechanism utilizes adjustment members which threadably engage the base and interact with the insert. By advancing the adjustment members into the base or backing them out of the base, the insert is respectively moved transversely to the axis of the main mold cavity.

The construction of the present invention is also such that the position of the insert can be adjusted while the pinch-off assembly remains rigidly attached to the main mold halves. On a multi-head, blow molding machine this feature is extremely efficient and convenient since it allows for a problem mold to be adjusted without affecting the remaining molds.

Additional benefits and advantages of the present invention will become apparent to those skilled in the art to which the present invention relates from the subsequent description of the preferred embodiment and the appended claims, taken in conjunction with the accompanying drawings.

BRIEF DESCRIPTION OF THE DRAWINGS

FIG. 3 is a top plan view of the neck finish pinch-off assembly of the present invention; and FIG. 4 is a cross sectional view taken substantially along line 4—4 in FIG. 3 of the present invention.

DETAILED DESCRIPTION OF THE PREFERRED EMBODIMENT

Figure 1:
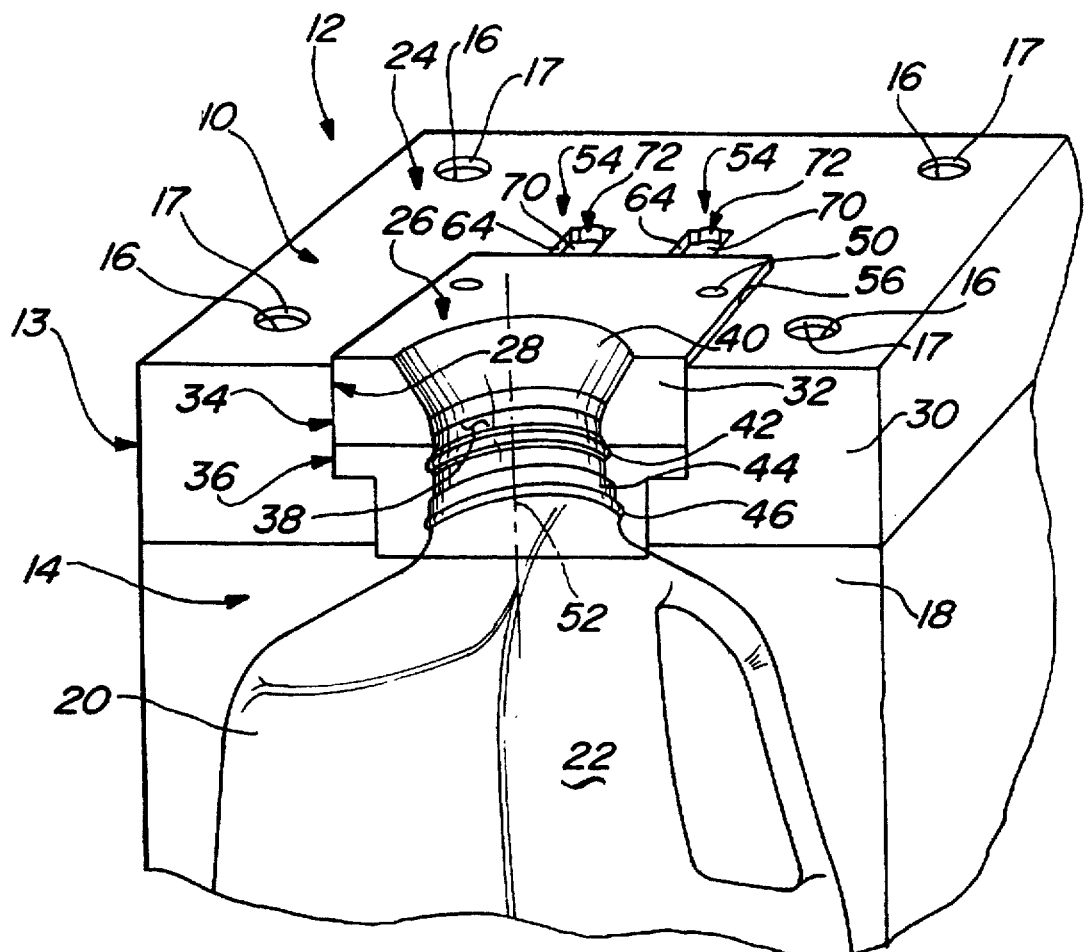
FIG. 1 is a perspective view of half of a mold assembly incorporating the adjustable pinch-off neck assembly of the present invention.

Referring now to the drawings, an adjustable pinch-off neck assembly according to the principles of the present

3 invention is generally illustrated in FIG. 1 and designated at 10. The pinch-off assembly 10 is illustrated in connection with an extrusion blow molding system 12 which includes a mold 13 comprised of a main mold 14 and the pinch-off neck assembly 10. For convenience and clarity, only one-half of the pinch-off neck assembly 10 and main mold 14 are being illustrated in the figures. It will therefore be readily appreciated and understood by persons skilled in the art that the corresponding halves are substantially the same in their general construction. The discussion which follows regarding the pinch-off assembly 10 and the main mold 14 therefore equally pertains to the non-illustrated halves.

As seen in FIG. 1, the pinch-off assembly 10 is mounted to the top of the main mold half 14 by machine bolts 16 extending through bores 17 into corresponding threaded bores (not shown) defined in the main mold 14. The main mold 14 further includes a parting face 18 and surface portions 20 which define the container cavity 22 of the main mold 14.

Principally made up of two components, the pinch-off neck assembly 10 includes a base 24 and an insert 26. A recess 28 is defined in the base 24 to receive the insert 26. The base 24 and insert 26 are mounted on the main mold 14 so that a base parting face 30 on the insert 26 and an insert parting face 32 on the base 24 are aligned and flush with the parting face 18 of the main mold 14. The precise alignment of these parting faces 18, 30, 32 ensures proper mating of the two mold halves about the parison when closed, proper molding of the container, minimal flash formation and minimal wear to the pinch-off assembly 10 and the main mold 14.

Figure 2:
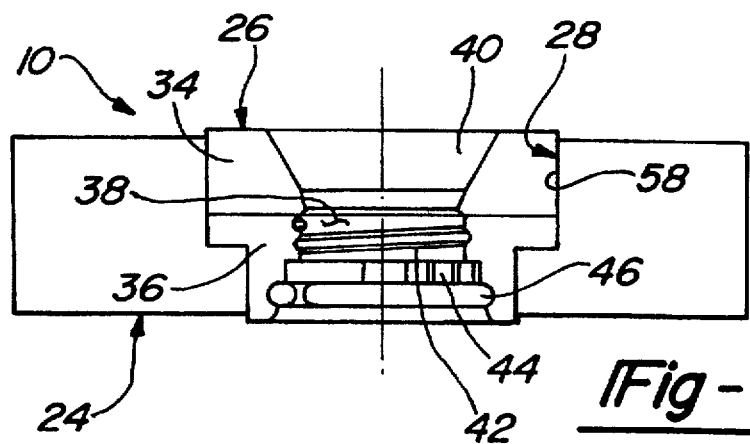
FIG. 2 is a side elevational view of the assembly seen in FIG. 1.

As seen in FIGS. 1, 2 and 4, the insert 26 is further comprised of an upper insert 34 and a lower insert 36. The upper and lower inserts 34, 36 include surfaces which cooperate to define a neck finish cavity 38 that forms the detail of the neck finish on a resulting container. A conical lead in surface 40 is provided on the upper insert 34 while the lower insert 36 includes surfaces shaped to define a thread finish 42, a toothed collar 44 and ring 46. The thread finish 42, toothed collar 44 and ring 46 are all design features which may vary from one container application to another. By providing the insert 26 with a two part construction and providing these features in only one of the two parts, namely the lower insert 36, the neck finish of a container is readily altered for a given container body style by interchanging the lower insert 36 with another lower insert having the desired design. The upper and lower inserts 34, 36 are securely retained together by bolts 48 or other fasteners. The bolts 48 are preferably inserted into bolt holes 50 defined in the upper insert 34 and corresponding bores (not shown) in the lower insert 36. These bolts 48 further extend into threaded bores (not shown) in the base 24 and also operate to secure the insert 26 to the base 24. Notably, the bores 50 are formed in the shape of transverse elongated slots.

To facilitate adjustment of the insert 26 relative to the base 24, an adjustment mechanism 54 is incorporated into the assembly 10. This adjustment mechanism 54 adjusts the insert 26 transversely to an axis 52 of the container and neck finish cavity 22. If the transverse positioning of the parting faces 32 of the closed halves of the insert 26 is not sufficiently tight, when the blow pin assembly is downwardly extended, the force applied against the pinch-off neck assembly 10 can cause the halves of the assembly 10 to separate and/or open. This in turn creates various molding problems as mentioned and discussed above. The adjustment mechanism 54 of the present invention provides insert of each mold in a multi-cavity molding system with the capability of being individually adjusted to accommodate the blow pin assembly and prevent separation. Additionally, the adjustment mechanism 54 is constructed so that the insert 26 can be positioned without requiring removal of the pinch-off neck assembly 10 from the main mold as required with prior shimming adjustment procedures. In this manner, the present system is faster, more accurate and easier to implement.

While alternative constructions can be provided for the adjustment mechanism detailed below, it should be understood that the scope of the present invention is not strictly limited to the illustrated embodiment. An adjustment mechanism 54 which allows for transverse adjustment of the insert 26 relative to the base, without requiring removal of the insert 26 from the base 24 or the base 24 from the main mold 14, is considered to be within the purview of the present invention.

As mentioned above, the insert 26 resides within a recess 28 formed in the base 24. The recess extends laterally inward from the parting face 30 into the base 24 and is defined by side walls 56 and a rear wall 58. While illustrated as having a generally rectangular construction, it is readily apparent that the recess 28 can alternatively be arcuate, semi-circular or poly-sided so long as the insert 26 is correspondingly shaped. The rectangular construction, however, is believed to be preferred because of its ease of manufacture. In the rear wall 56 of the recess are formed with a pair of guide slots 64. The guide slots 64 are spaced apart from one another on the rear wall 58 and are axially oriented, generally parallel to the axis 52. As seen in FIG. 4, the guide slots 64 extend from a top surface 66 to bottom surface 68 of the base 24, completely through the base 24.

The shape of the guide slots 64 is illustrated as being rectangular. However, the rearmost wall 69 of the guide slot 64 exhibit a slight taper 71 progressing toward the bottom surface 68 of the base 24. Preferably this taper 71 is less than 5° and more preferably about 1°.

As mentioned above, the insert 26 is correspondingly shaped to fit and transversely move within the recess 28. Like the recess 28, the insert 26 includes side walls 60 and a rear wall 62, the rear wall 62 being generally opposite of the parting face 32.

Positioned within each guide slot 64 and adjacent the rear wall 62 of the insert 26 is a guide or wedge 70. Complimentary to the rearmost walls 69 of the guide slots 64, the rearmost surfaces 73 of the wedges 70 are also formed with a taper 75. The shape and size of the wedges 70 are such that the wedges 70 extend and fit into the guide slots 64 of the base 24. The front side 77 of the wedges 70, opposite the rearmost surfaces 73, is not tapered and is in surface-to-surface contact in the rear surface 62 of the insert 26.

Formed in the base 24 adjacent to the guide slots 64 are bores 72 which consist of a threaded portion 74 and an enlarged or countersunk portion 76. Adjustment members or screws 78 are provided with threaded ends 80 that matingly engage in the threaded portions 74 of the bores 72. The opposing ends of the adjustment screws 78 are formed with heads 82. The size of the heads 82 are such that the head can be received within the countersunk portions 76 of the bores 72. The heads 82 are further provided with driving means 84, such as a hex, for adjustably positioning the screws 78 within the bores 72.

Each bore 72 is located relative to the adjacent guide slot 64 such that the countersunk portion 76 breaks through and into the guide slot 64. This is readily seen in FIGS. 1, 3 and 4. For reasons more fully described below, when constructed in this manner and the screws 78 are located within the bores 72, a portion of the heads 82 will extend into the guide slot 64.

An outwardly concave slot 86 is formed in each guide 70, as seen in FIGS. 3 and 4. These two slots 86 are adapted to receive and captively retain the heads 82 of the screws 78. The slots 86 are generally arcuate (with poly-sided shapes being possible) and extend laterally into the guides 70. Importantly, the axial height of the slots 86 are such that they captively retain the heads 82 of the screws 78 therein. With the screws 78 threadably engaged with the base 24, the insert 26 exhibits a minimal amount of axial play relative to the base 24 because of the captive retention of the screw heads 82 in the slots 86. In the illustrated embodiments, it is seen that the slots 86 define that portion of the circumference of the countersunk portions 76 which would otherwise be present if the countersunk portions 76 did not break into the guide slots 64.

During use of the system 12, if it is found the separation is occurring in the pinch-off assembly 10 of one of the molds, the lateral adjustment of that pinch-off assembly 10, and in particular, the parting faces 32 of the insert are adjusted as follows. First the bolts 48 are loosened. Second, the screws 78 are either advanced into or backed out of the threaded portions 74 of the bores 72. By advancing or retracting the screws 78, the captive retention of the heads 82 of the screws 78 within the slots 86 of the wedges 70 causes the wedges 70 to move axially within the guide slots 64. As a further results, the tapers 71 on the slots 64 and the tapers 75 on the wedges 70 slide along one another transversely moving the front sides 77 of the wedges 70. Since the front sides 77 of the wedges 70 contact the rear wall 62 of the insert 26, transverse movement of the wedges 70 cause transverse movement of the insert 26 and its parting face 32 relative to the base 24 and its parting face 30. The amount of adjustment by the screws 78, generally designated at 88, controls the lateral adjustment of the insert parting face 32. Preferably, the total lateral adjustability of the parting face 32 is at least 0.001 inches and more preferably greater than 0.002 inches. By increasing the number of threads per inch on the threaded ends 80 of the adjustment screws 78 and in the threaded portion 80 of the bore 74, the adjustment mechanism 54 is provided with a greater degree of adjustability allowing the position of the insert 26 to be more finely tuned.

While the above description constitutes the preferred embodiment of the present invention, it will be appreciated that the invention is susceptible to modification, variation and change without departing from the proper scope and fair meaning of the accompanying claims.

We claim:

1. A pinch-off neck assembly for use in a container blow mold system, said assembly comprising:
   a base having a top surface, a bottom surface, a base parting face and portions defining a recess in said parting face;
   an insert received in said recess, said insert having an insert parting face coincident with said base parting face, said insert including surfaces defining a neck finish cavity for forming a neck finish of the container; and
   adjustment means for adjustably positioning said insert in said recess and relative to said base along an axis parallel to said parting face.

2. The assembly as set forth in claim 1 wherein said base includes a top surface and a bottom surface, said adjustment means adjustably positioning said insert along an axis extending between said top and bottom surfaces.

3. The assembly as set forth in claim 2 wherein said adjustment means axially positions said insert between said top and bottom surfaces.

4. The assembly as set forth in claim 1 wherein said adjustment means includes an adjustment member, said member engaging both said base and said insert whereby movement of said adjustment member relative to said base causes corresponding movement of said insert relative to said base.

5. The assembly as set forth in claim 4 wherein said base includes a threaded bore, said member having a threaded end engaged within said bore.

6. The assembly as set forth in claim 5 wherein said adjustment member also includes an end having a head, said head engaging said insert.

7. The assembly as set forth in claim 6 wherein said insert includes portions defining a head slot, said head being captively retained in said head slot.

8. The assembly as set forth in claim 7 wherein said head slot includes two generally parallel surfaces, said surfaces being located on opposing sides of said head and captively retaining said head therebetween.

9. The assembly as set forth in claim 5 wherein said adjustment member include driving means for adjustably positioning said adjustment member in said bore.

10. The assembly as set forth in claim 1 wherein said recess includes portions defining a guide slot and said insert includes portions defining a guide, said guide being received in said guide slot.

11. The assembly as set forth in claim 10 wherein said adjustment means includes an adjustment member having a threaded end and a head, said base having portions defining a threaded bore and said threaded end of said adjustment member being received in said bore, said bore being generally adjacent to said guide slot, portions of said guide defining a head slot in said guide, said head of said adjustment member being received in said head slot.

12. A pinch-off neck assembly for use in a container blow mold system, said assembly comprising:
   a base having a top surface, a bottom surface, a base parting face and portions defining a recess in said parting face;
   an insert received in said recess, said insert having an insert parting face coincident with said base parting face, said insert including surfaces defining a neck finish cavity for forming a neck finish of the container; and
   adjustment means for adjustably positioning said insert in said recess along an axis extending between said top and bottom surfaces and relative to said base, said adjustment means includes an adjustment member connected to said base and said insert whereby movement of said adjustment member relative to said base causes corresponding movement of said insert relative to said base.

13. The assembly as set forth in claim 12 wherein said base includes a threaded bore, said member having a threaded end engaged within said bore, said adjustment member also includes an end having a head, said head engaging said insert.

14. The assembly as set forth in claim 13 wherein said insert includes portions defining a head slot, said head being captively retained in said head slot.

15. The assembly as set forth in claim 12 wherein said recess includes portions defining a guide slot and said insert includes portions defining a guide, said guide being received in said guide slot.

16. The assembly as set forth in claim 15 wherein said adjustment means includes an adjustment member having a threaded end and a head, said base having portions defining a threaded bore and said threaded end of said adjustment member being received in said bore, said bore being generally adjacent to said guide slot, portions of said guide defining a head slot in said guide, said head of said adjustment member being received in said head slot.

17. A mold for use in a container blow mold system, said mold comprising:

a main mold, said main mold having a main parting face, a main top surface, and portions defining a container molding cavity;

a pinch-off neck assembly including a base and an insert, said pinch-off neck assembly being mounted on said main top surface of said main mold, said base having a base top surface, a base bottom surface, a base parting face coincident with said main parting face and portions defining a recess in said parting face, said insert being received in said recess for relative movement with respect thereto, said insert having an insert parting face coincident with said base parting face, said insert including surfaces defining a neck finish cavity for forming a neck finish of the container, portions of said recess defining a guide slot and said insert including portions of said insert defining a guide, said guide being received in said guide slot; and adjustment means for adjustably positioning said insert axially in said recess between said base top and bottom surfaces, said adjustment means including an adjustment member connecting said base to said insert, said adjustment member having a threaded end and a head and said base having portions defining a threaded bore, said threaded bore of said adjustment member being received in said bore and said bore being generally adjacent to said guide slot, portions of said guide defining a head slot in said guide, said head of said adjustment member being received in said head slot, whereby movement of said adjustment member relative to said base causes corresponding movement of said insert relative to said base.

* * * * *